United States Patent [19]

Nagata et al.

[11] Patent Number: 5,356,272
[45] Date of Patent: Oct. 18, 1994

[54] FUEL SUPPLY DEVICE AND METHOD OF ASSEMBLING SAME

[75] Inventors: Kiyoshi Nagata, Anjo; Takeshi Matsuda, Obu, both of Japan

[73] Assignee: Nippondenso Co., Ltd., Kariya, Japan

[21] Appl. No.: 755,006

[22] Filed: Sep. 5, 1991

[30] Foreign Application Priority Data

Sep. 5, 1990 [JP] Japan .................. 2-236094
Feb. 8, 1991 [JP] Japan .................. 3-017771

[51] Int. Cl.$^5$ ............................. F04B 17/00
[52] U.S. Cl. ......................... 417/366; 417/423.7
[58] Field of Search .......... 417/423.3, 423.7, 423.11, 417/366, 369, 423.14; 310/85, 86, 54

[56] References Cited

U.S. PATENT DOCUMENTS

| | | | |
|---|---|---|---|
| 2,993,449 | 7/1961 | Harland | 417/423.14 |
| 3,365,122 | 1/1968 | Hajec et al. | 417/423.14 |
| 3,685,926 | 8/1972 | Blum | 417/423.3 |
| 4,566,866 | 1/1986 | Kemmner | 417/423.7 |
| 4,726,746 | 2/1988 | Takada et al. | 417/423 R |
| 4,998,865 | 3/1991 | Nakanishi et al. | 417/423.7 |

FOREIGN PATENT DOCUMENTS

| | | | |
|---|---|---|---|
| 0163126 | 12/1985 | European Pat. Off. | 417/423.3 |
| 60-55250 | 4/1985 | Japan . | |
| 60-81489 | 5/1985 | Japan . | |
| 60-149892 | 10/1985 | Japan . | |
| 61-14496 | 1/1986 | Japan . | |
| 62-59794 | 4/1987 | Japan . | |
| 62-59795 | 4/1987 | Japan . | |
| 62-267564 | 11/1987 | Japan . | |
| 63-176686 | 7/1988 | Japan . | |
| 1105395 | 7/1989 | Japan . | |
| 2103777 | 8/1990 | Japan . | |

Primary Examiner—Richard A. Bertsch
Assistant Examiner—Alfred Basichas
Attorney, Agent, or Firm—Cushman, Darby & Cushman

[57] ABSTRACT

A fuel pump for a vehicle includes a brushless motor for operating this fuel pump, and a control circuit for the brushless motor is contained in the fuel pump. Difficulties such as a cutting of the wiring due to an electrolytic corrosion of electrically-conductive portions, and a short-circuiting thereof, are prevented. A pump portion, a motor portion and a discharge portion are provided in a housing of the fuel pump. The motor portion includes a rotor and a stator portion. The stator portion is molded by a resin material into a cylindrical shape with a closed bottom. The stator portion supports a shaft of the rotor. Stator coils are molded in a peripheral wall portion of the stator portion, and a container containing the control circuit is molded in the bottom wall portion of the stator portion. The stator coils, copper wires extending therefrom, and terminals from the control circuit are completely molded in the above resin material. With this arrangement, the stator coils, the control circuit, and the electrically-conductive portions extending between the control circuit and the stator coils are not exposed to the fuel at all, and therefore the above difficulties are prevented.

24 Claims, 8 Drawing Sheets

FUEL SUPPLY DEVICE AND METHOD OF ASSEMBLING SAME

BACKGROUND OF THE INVENTION

1. Field of the Invention

This invention relates generally to a fuel supply device for a vehicle, and more particularly to a fuel supply device of the type in which a brushless motor is used as a drive motor for a fuel pump, and a control circuit for the brushless motor is integrated with the fuel pump and the motor so that the fuel supply device can be mounted within a fuel tank of the vehicle.

2. Background of the Art

There have heretofore been proposed fuel supply devices for a vehicle which use a brushless motor. For example, there is known a fuel supply device for a vehicle as disclosed in Japanese Utility Model Unexamined Publication No. 62-59794. In this conventional device, a control circuit for controlling the excitation of stator coils is accommodated within a container, and pressurized gas is sealed in this container, thus integrally providing the control circuit within a housing of a fuel pump.

In this conventional construction, since the control circuit is isolated from fuel, disadvantages, such as a conduction failure of the control circuit due to an electrolytic corrosion, and a short-circuiting of a circuit wiring, are prevented. In this conventional construction, however, wires connecting the control circuit to the stator coils are exposed to the fuel, and therefore, there has been a possibility that terminals connected to the control circuit, and the copper connection wires, and the stator coils may be subjected to an electrolytic corrosion, which results in a conduction failure and a short-circuiting.

Another problem with the conventional construction is that when its parts are to be mounted in the housing, the stator coils and the control circuit are connected together by the wires in a narrow space available within the housing, so that the efficiency of the assembling operation is poor.

The conventional construction suffers from a further problem in that since the stator coils and the control circuit are connected together by the wires when the parts are to be mounted in the housing, such connection portions are inevitably exposed to the fuel.

SUMMARY OF THE INVENTION

With the above problems of the prior art in view, it is an object of this invention to provide a fuel supply device in which a control circuit for a brushless motor for driving a fuel pump is integrated with the fuel pump and the motor, and difficulties, such as an electrolytic corrosion, a conduction failure and a short-circuiting, can be greatly reduced.

Another object of this invention is to provide a fuel supply device which can be assembled easily.

In order to achieve the above objects, according to the present invention, there is provided a fuel supply device for a vehicle including a housing, the housing containing therein a rotor having a permanent magnet fixedly mounted thereon, a plurality of stator coils mounted around the rotor, a control circuit for controlling the energization of the stator coils, and a pump portion driven by the rotor; the stator coils, the control circuit and electrically-conductive portions connecting them together being covered with a resin material (enclosure member).

With this construction of the invention, the control circuit, the stator coils and the electrically conductive members are isolated from the fuel. And besides, the enclosure member of a cylindrical shape with a closed bottom integrally supports the control circuit and the stator coils. The control circuit and the stator coils are integrated with each other outside the housing, and the electrically-conductive members are connected thereto, and then this cylindrical assembly can be mounted in the housing. Therefore, the assembling operation is easy. And besides, since the control circuit, the stator coils and the electrically-conductive members can be isolated from the fuel, and therefore a conduction failure of the electrically-conductive portions due to an electrolytic corrosion, a short-circuiting due to the deposition of dirt thereon, and so on can be prevented.

The enclosure member enclosing the control circuit, the stator coils and the electrically-conductive members may be made of a resin material. In this case, the enclosure member can be molded into a required shape, using a mold, and the control circuit and the stator coils can be integrally connected to each other, and at the same time the electrically-conductive members can be enclosed. Therefore, this integral construction and the separation of these parts from the fuel can be achieved easily and positively.

By forming a fuel passageway in the bottom portion of the cylindrical resin portion, the interior of the housing can used as part of the fuel passage.

The enclosure member enclosing the control circuit, the stator coils and the electrically-conductive members may be a container. The container has an internal space of a cylindrical shape with a closed bottom, and the control circuit, the stator coils and the electrically-conductive members are accommodated within the container. Therefore, the container fixes the control circuit and the stator coils integrally with each other, and at the same time encloses the electrically-conductive members. Therefore, the integral construction and the separation from the fuel can be done easily and positively.

By providing a fuel passageway between the container and the housing, the interior of the housing can be used as part of the fuel passage.

The container may also have double cylindrical walls.

Also, according to the present invention, the control circuit and the stator coils may be integrated with each other by a resin material (resin portion) of a cylindrical shape with a closed bottom. The electrically-conductive members are embedded in this resin material. Therefore, the electrically-conductive members are isolated from the fuel, and difficulties, such as a conduction failure due to an electrolytic corrosion and a short-circuiting due to the deposition of dirt, can be positively prevented. Further, since the cylindrical assembly with the closed bottom is inserted into and fixed to the housing, the assembling operation can be carried out easily.

According to a method of assembling the fuel supply device, after the control circuit and the stator coils are connected integrally with each other by the cylindrical assembly, the assembling operation can be carried out easily. Particularly, since the electrically-conductive members are enclosed by the enclosure member simultaneously with the formation of the integral construction, the electrically-conductive members can be isolated from the fuel, and difficulties, such as a conduction failure due to an electrolytic corrosion and a short-circuiting due to the deposition of dirt, can be positively prevented.

In the assembling method of the invention, also, the control circuit and the stator coils are integrated with each other by the resin material, and the electrically-conductive members are embedded in the resin material. The cylindrical assembly formed by the resin material is inserted into and fixed to the housing.

In the assembling method of the invention, the control circuit, the stator coils and the electrically-conductive members are accommodated within the container. Then, this cylindrical assembly with the closed bottom is inserted into and fixed to the housing.

DESCRIPTION OF THE PREFERRED EMBODIMENTS

Figure 1:
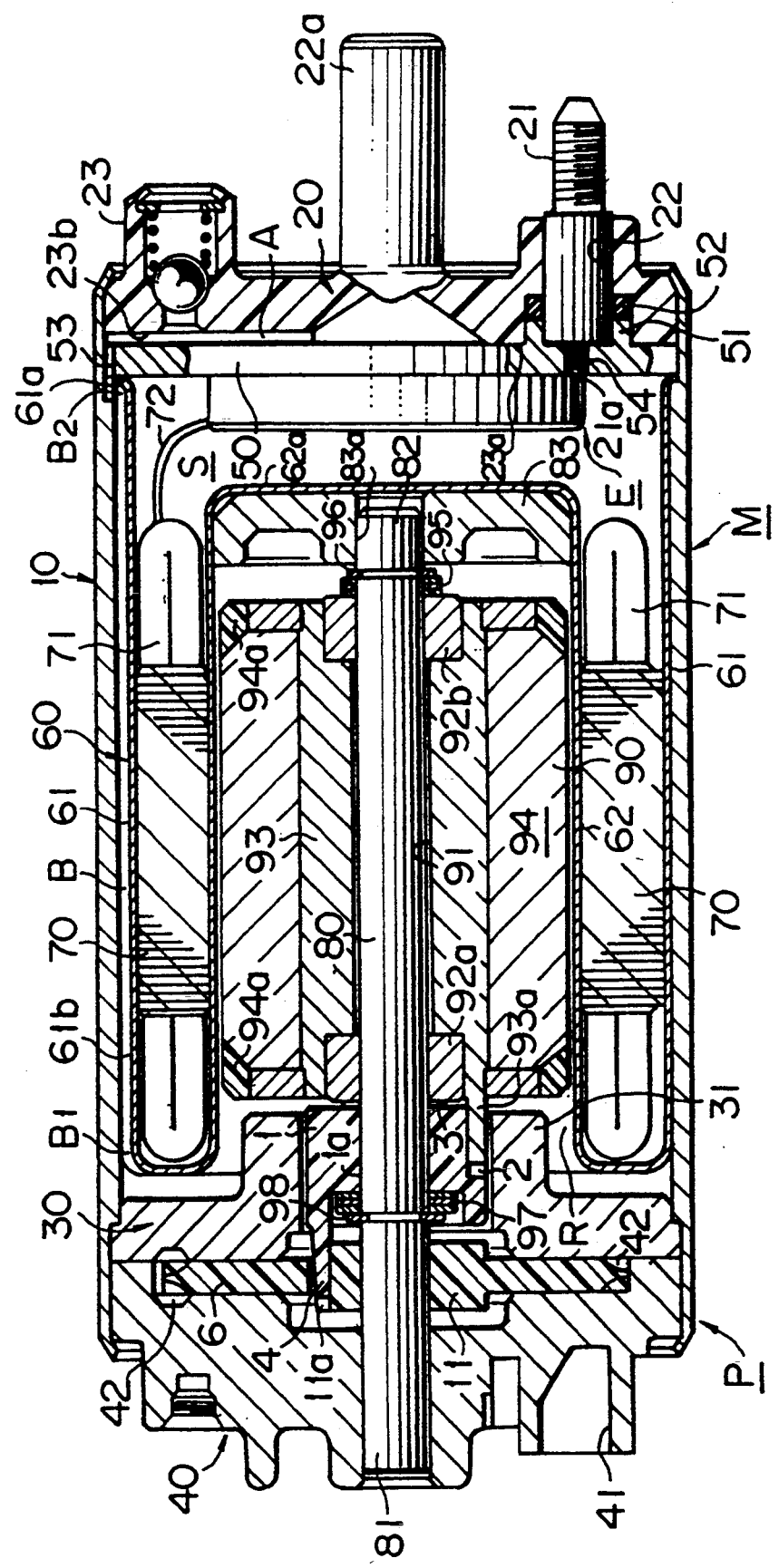
FIG. 1 is a vertical cross-sectional view of an electrically-operated fuel supply device for a vehicle according to a first embodiment of the present invention.

FIG. 1 shows an electrically-operated fuel supply device for a vehicle according to a first embodiment of the present invention. This fuel supply device comprises a DC motor M of the brushless type, a pump P of the circumferential flow type integrally connected to the DC motor M in coaxial relation thereto, and an electronic control element E for the DC motor M is mounted within the DC motor M. The DC motor M comprises a cylindrical housing 10, and an end bracket 20 is fixedly fitted in one end portion of the housing 10 in coaxial relation thereto. An end bracket 30, which also serves as a housing member for the pump P, is together with another housing member 40 for the pump P, fixedly fitted in the other end portion of the housing 10 in coaxial relation thereto. A connection terminal 21 is press-fitted in a smaller-diameter portion of a stepped hole 22 formed through the end bracket 20. The connection terminal 21 connects an external DC power source to the electronic control element E. In FIG. 1, reference numeral 22a denotes a discharge port for fuel which is provided at the end bracket 20, and reference numeral 23 denotes a relief valve.

A support base plate 50 has a generally disk-shape and is made of stainless steel. The support base plate 50 is held at its outer periphery in contact with the inner peripheral surface of one end portion of the housing 10, and a lower portion of the outer surface of the support base plate 50 abuts against a lower portion 23a of the inner surface of the end bracket 20. An annular boss 51, formed on the lower portion of the outer surface of the support base plate 50, is fitted, through an O-ring 52, in a larger-diameter portion of the stepped hole 22 of the end bracket 20 in coaxial relation thereto. In this manner, the support base plate 50 is attached to the inner surface of the end bracket 20 in parallel relation thereto. The lower portion 23a of the inner surface of the end bracket 20 is projected beyond and upper portion 23b of the inner surface of the end bracket 20 toward the other end portion of the housing 10 to provide a gap between the upper portion of the outer surface of the support base plate 50 and the upper portion 23b. This gap defines a communication passageway A leading to the inner end of the discharge port 22a.

A partition wall member 60 has a double-cylindrical construction as shown in FIG. 1. The integral partition wall member 60 is formed by deep-drawing a stainless steel sheet having a thickness of about 0.5 mm. The partition wall member 60 is mounted within the housing 10, and extends coaxially with the housing 10 to divide the interior of the housing 1 into a stator chamber S and a rotor chamber R. More specifically, an annular proximal end 61a of an outer cylindrical portion or wall 61 of the partition wall member 60 is fixedly secured liquid-tight to the outer peripheral portion of the inner surface of the support base plate 50 by welding. A recessed portion 61b of a U-shaped cross-section is formed at the upper portion (FIG. 1) of the outer cylindrical portion 61, and extends along the axis of the partition wall member 60. A communication passageway B of a square cross-section, which extends along the axis of the housing 10, is defined by the recessed portion 61b and that portion of the peripheral wall of the housing 10 disposed in opposed relation to this recessed portion 61b. One end B1 of the communication passageway B is communicated with the rotor chamber R, and the other end B2 of the communication passageway B is communicated with the upper end of the communication passageway A via a recess 53 of a U-shaped cross-section formed in the upper portion (FIG. 1) of the outer peripheral edge of the support base plate 50, the recess 53 corresponding in width to the communication passageway B. The outer cylindrical portion 61 is held in uniform contact with the housing 10 except for the recessed portion 61b.

As shown in FIG. 1, a stator 70 is mounted within the stator chamber S, and is immovably held between the outer cylindrical portion 61 and an inner cylindrical portion 62 of the partition wall member 60 in coaxial relation thereto. A field winding 71 wound on the stator 70 is connected via a connection conducting wire 72 to an outer terminal of the electronic control element E fixedly mounted on the support base plate 50 within the stator chamber S. An input terminal of the electronic control element E is connected to an electrically-conductive rod 21a extending from the inner side of the connection terminal 21 into a through hole 54 formed through the support base plate 50.

A rotor shaft 80 is fitted at its proximal end portion 81 in a central hole formed in the housing member 40, and extends through an annular boss 31 of the end bracket 30 into the inner cylindrical portion 62 of the partition wall member 60 in coaxial relation thereto within the rotor chamber R. A distal end portion 82 of the rotor shaft 80 is fitted coaxially in an annular central boss 83a of an annular bearing member 83 fitted coaxially in a bottom portion 62a of the inner cylindrical portion 62.

A rotor 90 has a hollow central portion 91 formed therethrough axially thereof, and the rotor shaft 90 extends through the hollow central portion 91. The rotor 90 is rotatably supported through bearings 92a and 92b on the rotor shaft 90 intermediate the opposite ends of the rotor shaft 90, and is disposed coaxially with the rotor shaft 90. The rotor 90 comprises a cylindrical yoke 93, and a cylindrical magnet 94 mounted on the outer periphery of the cylindrical yoke 93 in coaxial relation thereto. The opposite ends of the magnet 94 are covered with synthetic resin members 94a and 94a, respectively. The outer peripheral surface of the rotor 90 is uniformly spaced a predetermined distance from the inner peripheral surface of the inner cylindrical portion 62. Reference numeral 95 denotes an annular collar, and reference numeral 96 denotes a stop ring.

An annular member 1 is fitted at its axial bore 1a on the rotor shaft 81 intermediate the opposite ends of the rotor shaft 81 in coaxial relation thereto, and the annular member 1 is loosely fitted in the boss 31 of the end bracket 30. A connection portion 93a, extending from one end of the yoke 93 of the rotor 90 at its outer peripheral portion, is inserted into and fixed to a connection groove 2 formed in the outer peripheral surface of the annular member 1. With this arrangement, the annular member 1 rotates together with the rotor 90. One end of the annular member 1 is engaged with an inner race of the breaking 92a through an annular collar 3, and the other end of the annular member 1 is engaged with a stop ring 98 through an annular collar 97, thereby preventing an axial displacement of the annular member 1.

The pump P includes an impeller 6 having an annular boss 11. The impeller 6 is interposed between the housing member 40 and the end bracket 30, and the annular boss 11 is rotatably fitted on the proximal end portion 81 of the rotor shaft 80 in coaxial relation thereto. A connection portion 4, extending from the other end of the annular member 1 at its outer peripheral portion, is engaged in a connection hold 11a formed in the outer peripheral portion of the boss 11. Thus, the impeller 6 is connected to the annular member 1 so that the impeller 6 can rotate together with the annular member 1. With this construction, in response to the rotation of the impeller 6, the pump P draws the fuel into a pump chamber 42 through an intake port 41 formed in the housing member 40, and discharges the thus drawn fuel to the exterior via a communication hole (not shown) in the end bracket 30, the rotor chamber R, the two communication passageways B and A, the recess 53 in the support base plate 50, and the discharge port 22a.

In this first embodiment of the above construction, when the motor M rotates the rotor 90 under the control of the electronic control element E, the impeller 6 of the pump P rotates in response to the rotation of the annular member 1 caused by the rotation of the rotor 90, so that the impeller 6 draws the fuel into the pump chamber 42 via the intake port 41 in the housing member 40. Then, the pump P discharges the thus drawn fuel from the pump chamber 42 to the exterior via the communication hole in the end bracket 30, the rotor chamber R, the communication passageway B, the recess 53 in the disk-shaped support base plate 50, the communication passage A and the discharge port 22a.

In this case, the stator 70, the field winding 71, the connection conducting wire 72 and the electronic control element E, which are mounted within the stator chamber S, are positively isolated by the partition wall member 60 from contact with the above flowing fuel.

Therefore, rust on the stator 70 and an electrolytic corrosion of the field winding 71 and the connection wire 72, which would be well considered to develop due to the contact with the fuel, are positively prevented.

A fuel pump for a vehicle according to a second embodiment of the invention will now be described with reference to FIGS. 2 to 7.

Figure 2:
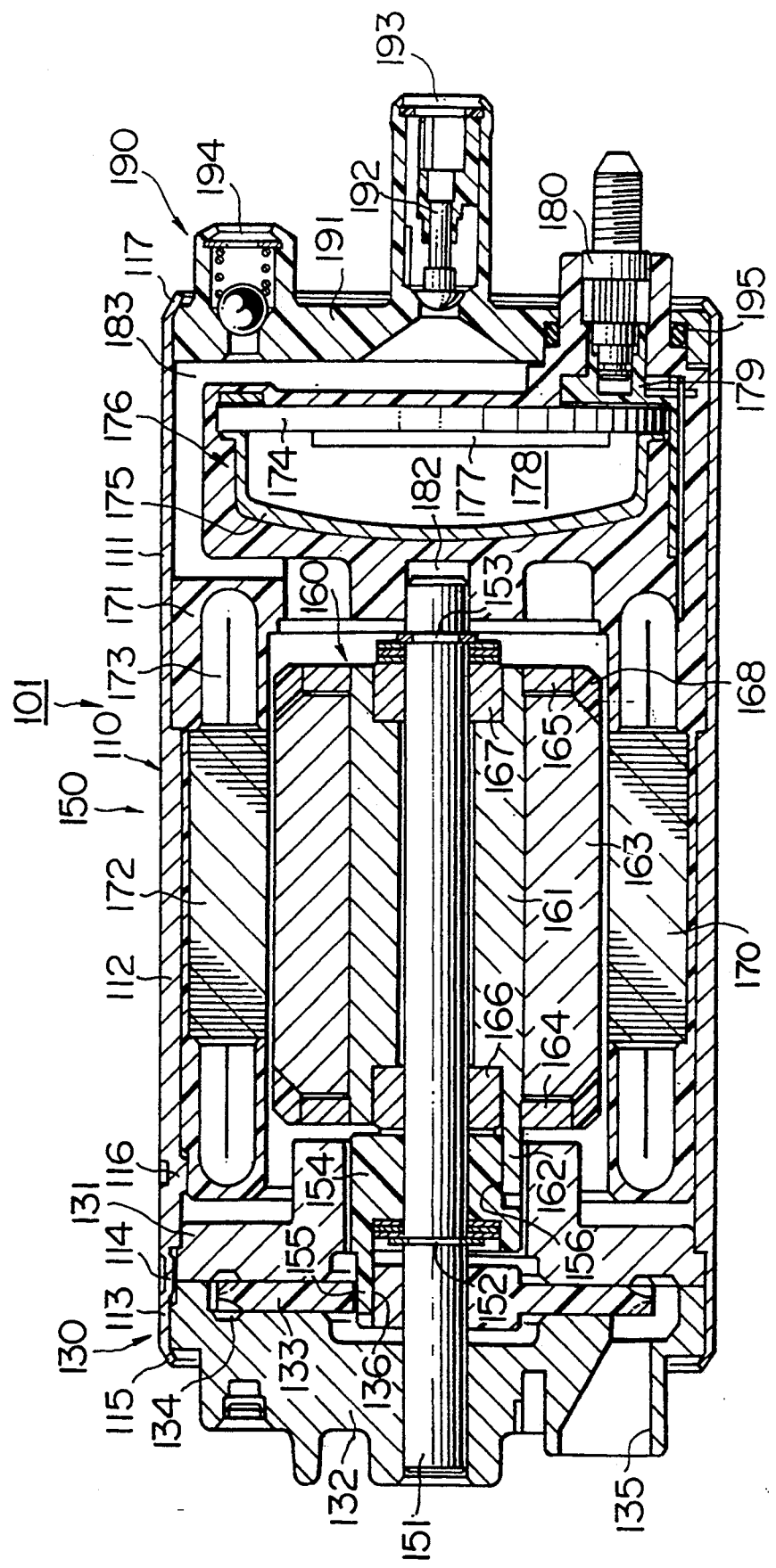
FIG. 2 is a vertical cross-sectional view of a fuel pump for a vehicle according to a second embodiment of the invention, taken along the line II—II of FIG. 3.
Figure 3:
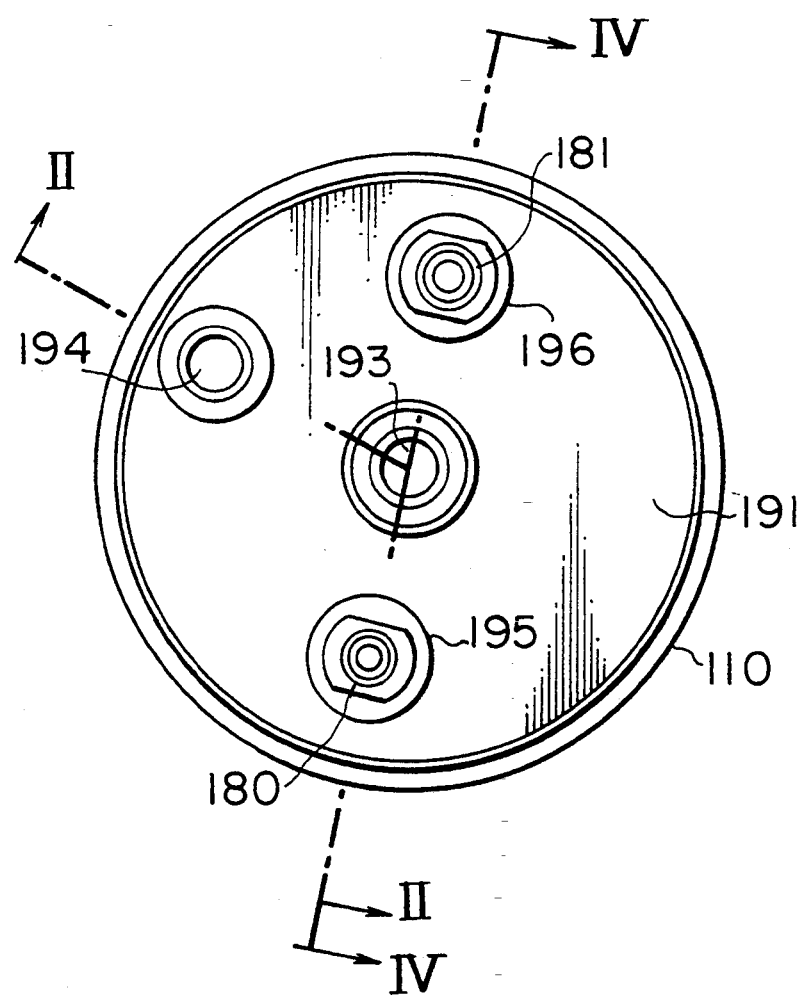
FIG. 3 is a top plan view of the fuel pump of FIG. 2.

FIG. 2 is a cross-sectional view of the fuel pump of the second embodiment taken along the line II—II of FIG. 3 showing this fuel pump from a discharge side of this pump.

Referring to FIG. 2, the fuel pump 101 for a vehicle includes a cylindrical housing 110 which has a thinned upper end portion 111, a thickened central portion 112 and a thinned lower end portion 113. A pump portion 130 is provided in the lower end portion 113, and a motor portion 150 is provided in the central portion 112, and a discharge portion 190 is provided in the upper end portion 111.

The pump portion 130 comprises a pump casing 131, a pump cover 132, and an impeller 133.

The pump casing 131 is tightly fitted into the thickened central portion 112 of the housing 110 from the lower end of the housing 110, with no gap being present between the pump casing 131 and the central portion 112. The pump cover 132 is press-fitted into the lower end portion 113 of the housing 110 from the lower end of the housing 110. The pump casing 131 and the pump cover 132 are prevented by a projection 114 on the housing 110 from rotation relative to the housing 110.

A pump chamber 134, serving as a regeneration pump, is formed between the pump casing 131 and the pump cover 132. The outer peripheral portion of the pump chamber 134 is sealed by urging the pump cover 132 toward the central portion 112 by a press-deformed portion 115 of the housing 110. A shaft 151 is press-fitted into the pump cover 132, and an intake port 135 communicated with the intake side of the pump chamber 134 is formed in the pump cover 132. An impeller 133 of the regeneration pump is rotatably provided between the pump casing 131 and the pump cover 132, and the shaft 151 extends through the impeller 133. A discharge port (not shown), which communicates the discharge side of the pump chamber 134 with the interior of the housing 110, is formed in the pump casing 131.

The motor portion 150 comprises a rotor 160 rotatably mounted on the shaft 151, and a stator portion 170 of an integral construction made of a resin material. Two peripheral grooves 152 and 153 are formed in the outer peripheral surface of the shaft 151, and C-rings are fitted in the two grooves 152 and 153, respectively. Three washers, a joint 154, one washer, the rotor 160 and three washers are rotatably fitted on the shaft 151, and are arranged in this order from the groove 152.

The joint 154 has a pawl 155 inserted in a joint hole 136 formed in the impeller 133, so that the joint 154 rotates together with the impeller 133. The joint 154 also has another pawl (not shown) which is disposed in opposite relation to the pawl 155 with respect to the shaft 151 and is inserted in another joint hole (not shown) formed in the impeller 133.

The rotor 160 includes a cylindrical yoke 161 of an electromagnetic stainless steel. The yoke 161 has a pawl 162 inserted in a joint groove 156 formed in the joint 154, so that the yoke 161 rotates together with the joint 154. The yoke 161 also has another pawl (not shown)

which is disposed in opposite relation to the pawl 162 with respect to the shaft 151 and is inserted in another joint groove (not shown) formed in the joint 154. Four ferrite magnets 163 are provided around and bonded to the outer periphery of the yoke 161 by an epoxy-type adhesive, and plate rings 164 and 165 of stainless steel are press-fitted in the opposite ends of this magnet assembly, respectively. Rings 166 and 167 of metal containing carbon are press-fitted respectively in the opposite ends of the yoke 161 at the inner periphery thereof. A PPS resin 168 is molded on the ferrite magnets 163 and the plate rings 164 and 165, so that the gap between any adjacent ferrite magnets 163 is fitted with this resin. In order to achieve a rotational balance of the rotor 160, each of the plate rings 164 and 165 has holes with a diameter of 0.5 to 2.0 mm which are suitably distributed over the plate ring.

The stator portion 170 is molded of an epoxy-type resin material 171 containing 20% of glass, and has a generally cylindrical shape with a closed bottom. The stator portion 170 is closely fitted into the central portion 112 of the housing 110 from the upper end of the housing 110, with the bottom of the stator portion 170 facing the upper end of the housing 110. The stator portion 170 is prevented by a projection 116, formed on the housing 110, from rotation relative to the housing 110. The stator portion 170 has a three-shape stator contained in its peripheral wall, and also has a control circuit portion contained in its bottom wall.

The stator includes a stator core 172, and stator coils 173 of three phases wound on the stator core 172. Copper wires at the opposite ends of the stator coil of each phase are extended to the control circuit portion.

The control circuit portion includes a container 176 composed of a disk-shaped plate 174 of stainless steel and a dome-shaped cover 175 of stainless steel. A control circuit 177 is mounted within the container 176. The disk-shaped plate 174 and the dome shaped cover 175 may be made of an iron sheet plated with nickel. A terminal holder 179 of a resin is provided adjacent to the disk-shaped plate 174 of the container 176. The terminal holder 179 holds a power supply terminal 180 and a power supply terminal 181 (shown in FIG. 3), respectively. The resin material 171 covers the terminal holder 179 and the proximal portions of the terminals 180 and 181.

A hole 182 is formed in the inner side of the bottom wall of the stator portion 170, and the end portion of the shaft 151 is received in this hole 182. A fuel passageway 183 is provided at a region extending from the inner side of the bottom wall of the stator portion 170 to the upper end of the housing 110, the fuel passageway 183 being provided between the upper end portion 111 and the container 176. With this arrangement, the fuel, discharged from the pump portion 130 to the interior of the housing 110, flows through a region around the rotor 160, and then flows radially from the inner side of the stator portion 170, and then flows through a groove, formed in the stator portion 170, and then flows into the space between the housing 110 and the container 176, and then flows toward the upper end of the housing 110.

The discharge portion 190 has an end cover 191 press-fitted in the upper end portion 111 of the housing 110. The end cover 191 is urged toward the central portion 112 of the housing 110 by a press-deformed portion 117 of the housing 110. The end cover 191 has a discharge port 193 which is communicated with the fuel passageway 183 in the stator portion 170, and a check valve 192 is mounted within the discharge port 193. The end cover 191 has a relief valve 194 communicated with the fuel passageway 183 in the stator portion 170, and also has holes 195 and 196 in which the terminals 180 and 181 are inserted, respectively. An O-ring is provided in each of the holes 195 and 196 in which the terminals 180 and 181 are inserted, respectively, so as to form a seal between the resin material 171, covering the proximal portions of the terminals 180 and 181, and the end cover 191.

The construction of the stator portion 170 will be described in further detail with reference to FIGS. 4 to 6.

Figure 4:
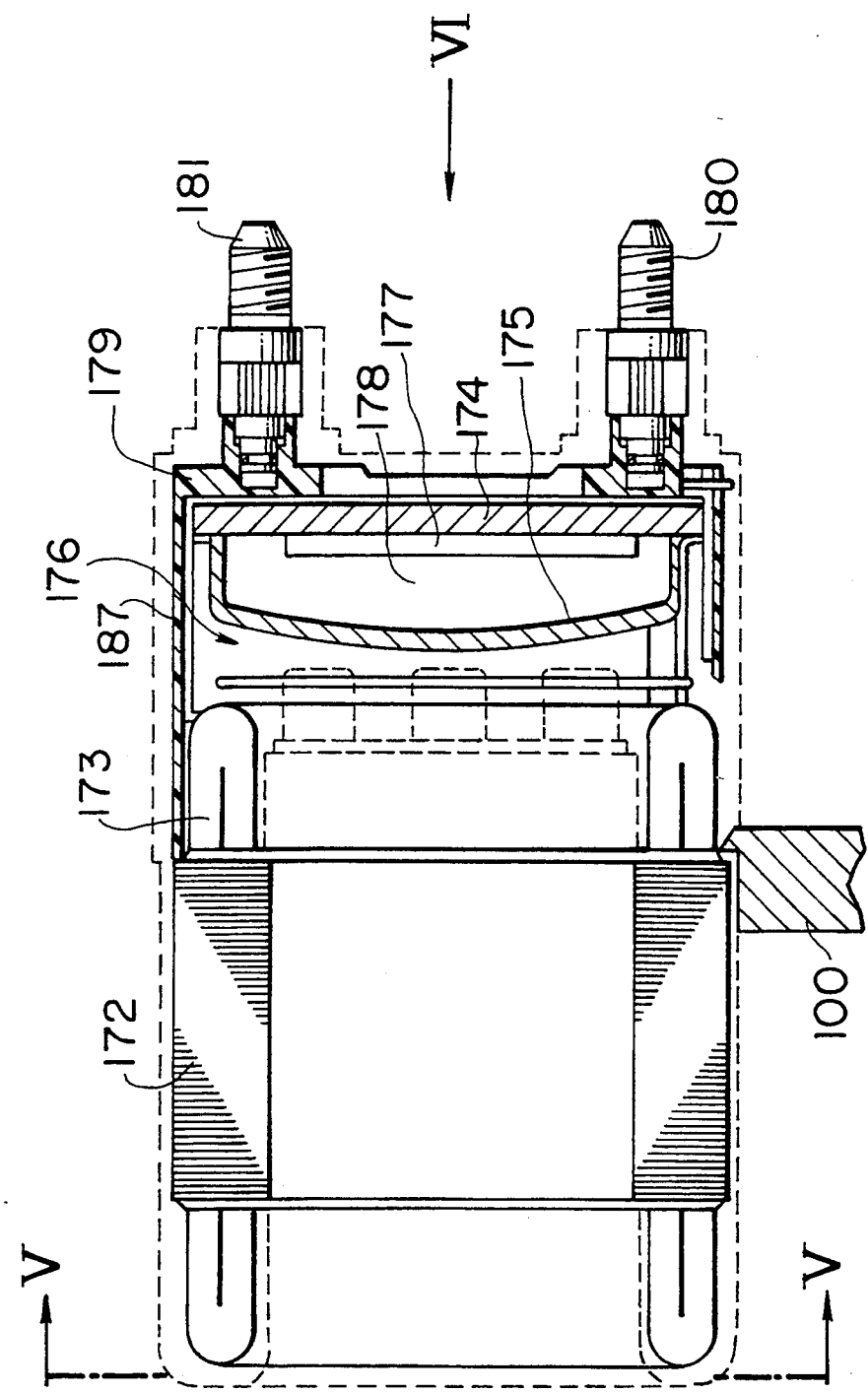
FIG. 4 is a vertical cross-sectional view of the fuel pump of FIG. 2 taken along the line IV—IV of FIG. 3.
Figure 5:
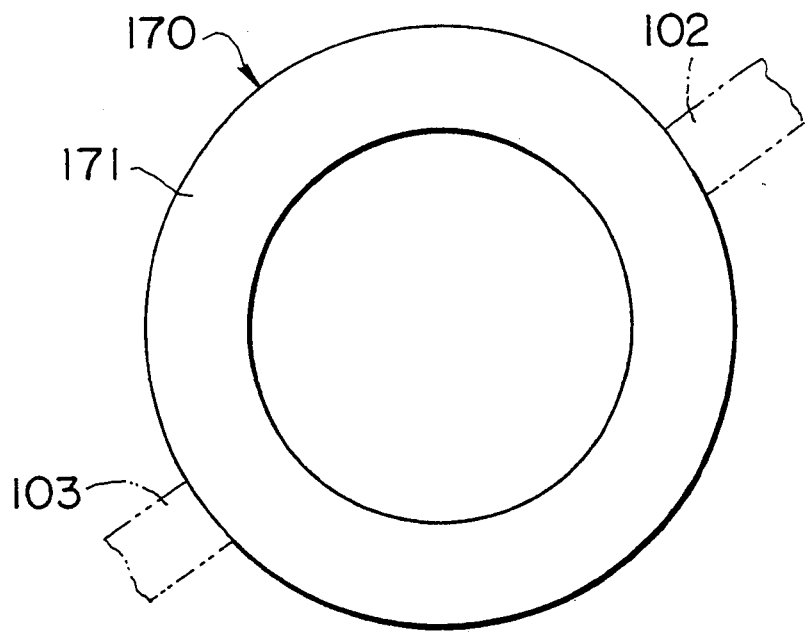
FIG. 5 is a cross-sectional view taken along the line V—V of FIG. 4.

FIG. 4 shows the construction of the stator portion 170. FIG. 4 is a cross-sectional view taken along the line IV—IV of FIG. 3 before the stator portion 170 is molded, in which the outer shape thereof after the molding is shown in broken lines. FIG. 5 is a cross-sectional view of the molded stator portion 170 along the line V—V of FIG. 4, showing the positions of molding gates.

Figure 6:
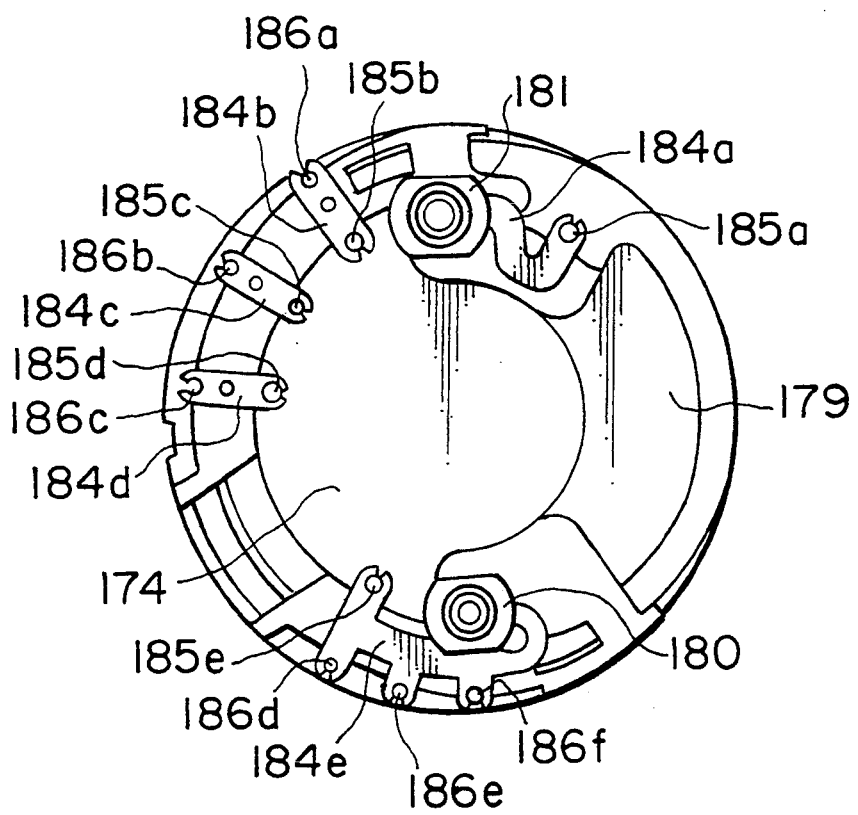
FIG. 6 is a top plan view of the fuel pump of FIG. 2.

FIG. 6 is a plan view of the stator portion 170 before the molding, as seen from an arrow VI of FIG. 4.

As shown in FIG. 6, terminals 184a, 184b, 184c, 184d and 184e (hereinafter designated collectively as 184) made of brass are mounted on the terminal holder 179. Terminals 185a, 185b, 185c, 185d and 185e (hereinafter designated collectively at 185) of the control circuit are extended through the disk-shaped plate 174 of the container 176. Copper wires 186a, 186b, 186c, 186d, 186e and 186f (hereinafter designated collectively at 186) at the opposite ends of the stator coils are extended to the peripheral portion of the terminal holder 179. The terminal 184a connects the terminal 181 to the terminal 185a, and the terminal 184b connects the terminal 185b to the copper wire 186a, and the terminal 184c connects the terminal 185c to the copper wire 186b, and the terminal 184d connects the terminal 185d to the copper wire 186c, and the terminal 184c connects the terminals 180 and 185e and the copper wires 186d, 186e and 186f together.

Before the molding, the terminals 180 and 181 and the container 176 are held by the terminal holder 179. A cylindrical stopper portion (guide portion) 187, extending from the terminal holder 179 in a manner to avoid the container 176, is contacted at its inner periphery with the outer periphery of the stator coil 173, and is also contacted at its distal end with the stator core 172, so that the positioning before the molding is effected. The fuel passageway 183, formed at the time of the molding by the resin material 171, extends through a hole formed in the cylindrical stopper portion 187.

The stator portion, which has been positioned by the terminal holder 179 and in which the necessary electrical connections have been made by the terminals 184, is placed in a mold. As shown in FIG. 4, in this mold, a receptive portion 100 projecting into the mold abuts against the stepped portion between the stator core 172 and the stator coil 173, and the stator portion is held by the terminals 180 and 181 and the receptive portion 100 on which the resin is not to be molded. As shown in broken lines in FIG. 5, the two resin supply gates 102 and 103 are provided at the right end (FIG. 4) remote from the container 176. In this mold, the resin material 171 completely covers the stator coils 173, the copper wires 186 of the stator coils, the terminals 184, the terminals 185 and the container 176.

After the stator portion 170 is molded in the above mold, the inner periphery and outer periphery thereof are suitably cut for centering purposes. In this cutting process, a portion of the molding produced by the draft of the mold in the molding process is cut. That is, the inner peripheral portion of the stator portion 170 is in the form of a conical-shaped wall surface immediately after the molding, which wall surface is required for removal of the stator portion 170 from the mold and will be made cylindrical-shaped after the cutting process.

Figure 7:
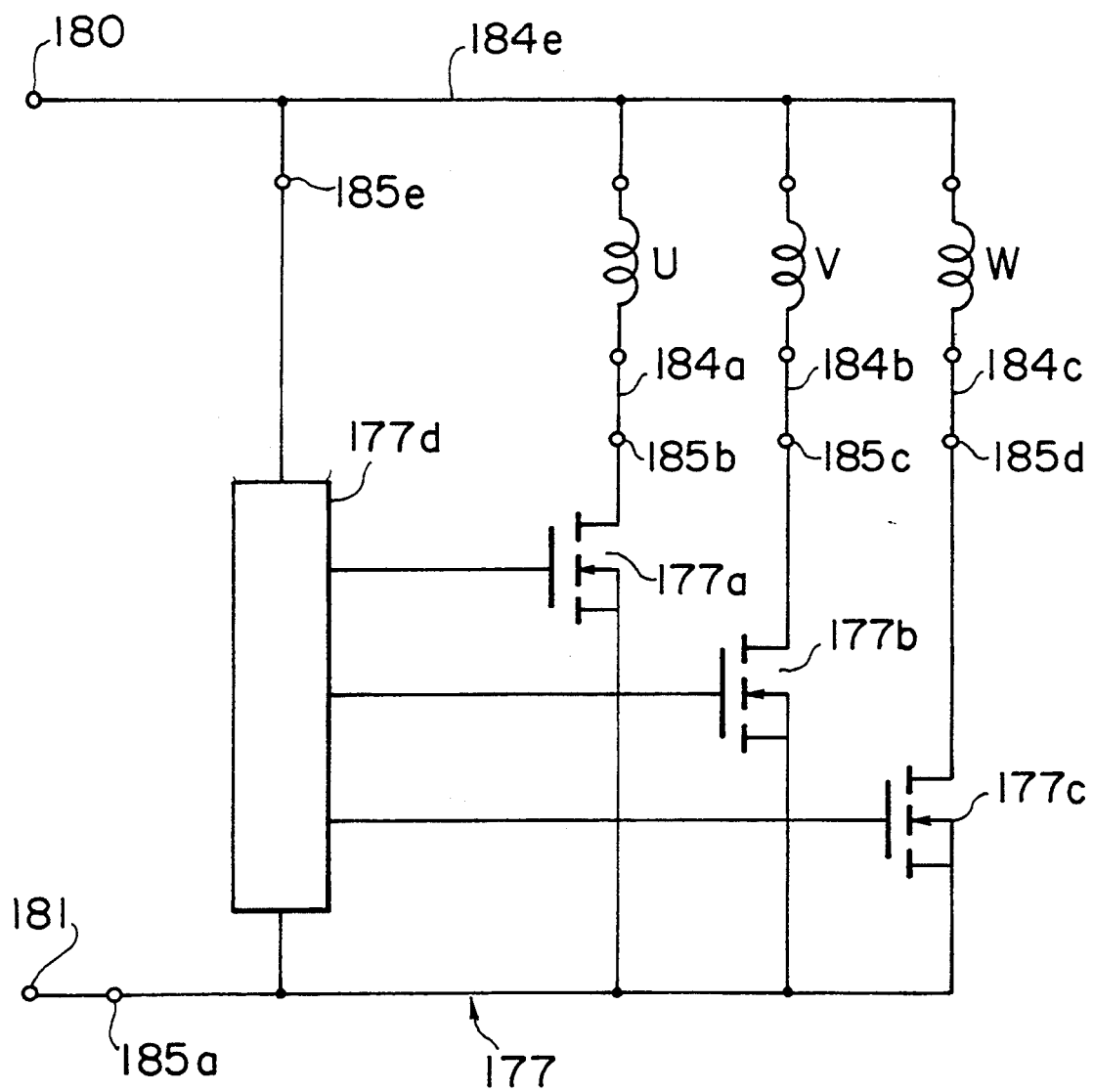
FIG. 7 is a circuit diagram of a control circuitry of the fuel pump of FIG. 2.

FIG. 7 is a circuit diagram of the control circuit 177.

The control circuit 177 includes power MOS-FETs 177a, 177b and 177c for interrupting the energization of U-phase, V-phase and W-phase stator coils, respectively, and a drive circuit 177d for driving the MOS-FETs 177a, 177b and 177c. The drive circuit 177d sequentially renders these FETs conductive with a predetermined overlapping time so as to excite the stator coil of each phase. Furthermore, the control circuit 177 contains therein a starting means for discriminating the polarity of the ferrite magnets 163 in the rotor 160 at the start-up of current-carrying to perform control of initial current-carrying commensurate to the stop position of the rotor 160, and a stop means for detecting excess voltage, excess current and excess temperature to stop the motor.

The operation of the above embodiment will now be described.

In actual use, a filter (not shown) is provided in the intake port 135, and a pipe (not shown) leading to a fuel injection device of the vehicle is connected to the discharge port 193, and the fuel pump for the vehicle is entirely held within a fuel tank by suitable stay members.

When power voltage is applied to the terminals 180 and 181, the drive circuit 177 sequentially renders the MOS-FETs 177a, 177b and 177c conductive with the predetermined overlapping time, thereby exciting the stator coil of each phase. By this three-phase half-wave driving, the armature (rotor) 160 rotates, and the impeller 133 rotates. In response to the rotation of the impeller 133, the fuel is drawn from the intake port 135, and is passed through the interior of the housing 110 and further through the fuel passageway 183, and then is discharged from the discharge port 193.

In the above embodiment, the stator coils 173, the copper wires 186 from the stator coils, the container 176 containing the control circuit 177, the terminals 185 from the container 176, and the terminals 184 are all covered with the resin material 171, and therefore are not exposed to the fuel. Therefore, difficulties, such as a short-circuiting and a wire-cutting which would otherwise occur in these electrically-conductive portions, for example, due to an electrolytic corrosion, is positively prevented, thereby greatly reducing the possibility of a malfunction.

Further, in the above embodiment, the resin material 171 is molded on the container 176 containing the control circuit 177. When the resin material 171 is to be molded to provide the stator portion, a molding pressure, usually, of 100 to 150 Kg/cm$^2$ has heretofore been used; however, in this embodiment, in view of the resistance of the container 176 against the molding pressure, the molding pressure is adjusted to 30 to 50 Kg/cm$^2$. And besides to withstand this molding pressure, the cover 175 of the container 176 is formed into a dome-shape. With this arrangement, there can be provided the container 176 which will not deform upon application of the molding pressure thereto, and the resin material 171 can be molded on the container 176 containing the control circuit 177.

Further, in this embodiment, the control circuit 177, which generates heat, is cooled by the fuel through the resin material 171 and the container 176. Since the cover 175 of the container 176 has a dome-shape, the thickness of the cover 175 can be decreased, so that the heat generated from the control circuit 177 can be efficiently transferred to the fuel.

Further, since the resin supply gates 102 and 103 are disposed remote from the container 176, the molding pressure is lower in the vicinity of the container 176 because of a pressure loss. This also serves to prevent the deformation of the container 176 during the molding.

Further, in the above embodiment, the resin material 171 covers the electrically-conductive portions, and also performs the function of a holder supporting the shaft 151, and therefore the number of the component parts can be reduced.

Further, in the above embodiment, the cylindrical guide portion 187 is extended from the terminal holder 179, and the positioning can be positively made before the molding operation.

Next, a third embodiment of the invention will be described with reference to FIG. 8.

Figure 8:
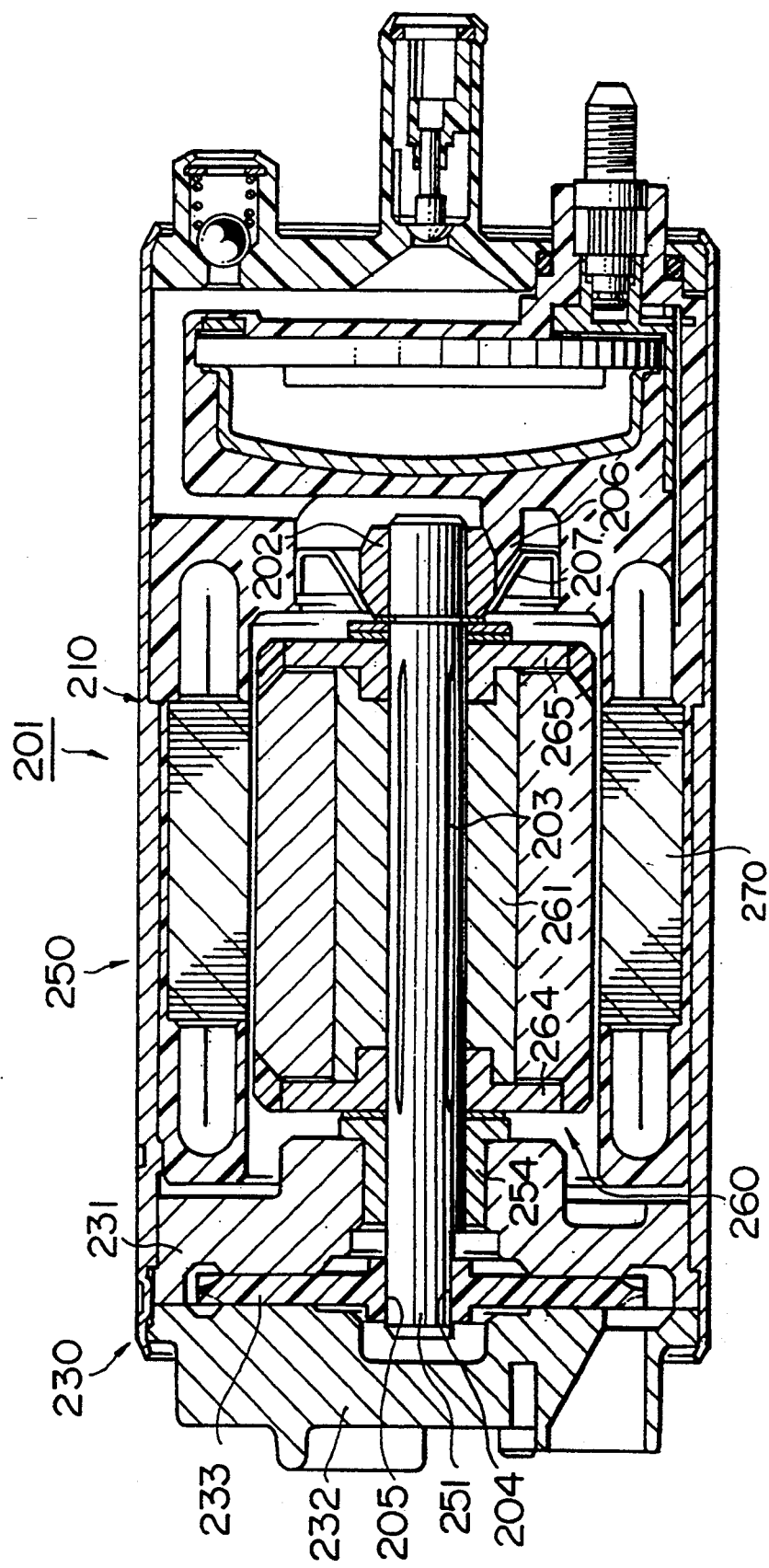
FIG. 8 is a vertical cross-sectional view of a fuel pump for a vehicle according to a third embodiment of the invention.

FIG. 8 is a cross-sectional view of a fuel pump 201 for a vehicle according to the third embodiment. Those parts of this embodiment, which correspond to those of the second embodiment and achieve generally similar functions, will not be explained here.

In the above second embodiment, the shaft 151 is fixed, and the rotor 160 is rotatably mounted on this shaft 151; however, in this third embodiment, a shaft 251 is rotatably supported, and a rotor 260 is fixedly mounted on the shaft 261.

The shaft 251 is rotatably supported at its one end portion by a bearing 254 mounted on a pump casing 231, and is also rotatably supported at the other end portion thereof by an aligning bearing 202 provided on an inner side of a bottom wall of a stator portion 270. Grooves 203 are formed in the outer peripheral surface of the central portion of the shaft 251, and extend axially of the shaft 251. A yoke 261 of a rotor 260 is press-fitted on this central portion of the shaft 251. The shaft 251 has a D-shaped portion 204 which is inserted in a D-shaped hole 205 formed through an impeller 233. The bearing 254 is press-fitted in the pump casing 231. The aligning bearing 202 is supported by a receptive portion 206 formed on the inner side of the bottom wall of the stator portion 270, and is held by a bearing stopper 207.

In this embodiment, the shaft 251 rotates together with the rotor 260, and the impeller 233 rotates in response to the rotation of the shaft 251, and fuel is discharged from the fuel pump in a manner similar to that described above for the second embodiment.

In this third embodiment, as in the second embodiment, all the electrically-conductive portions are covered, and effects similar to those achieved with the second embodiment can be attained.

Next, a fourth embodiment of the invention will be described with reference to FIG. 9.

Figure 9:
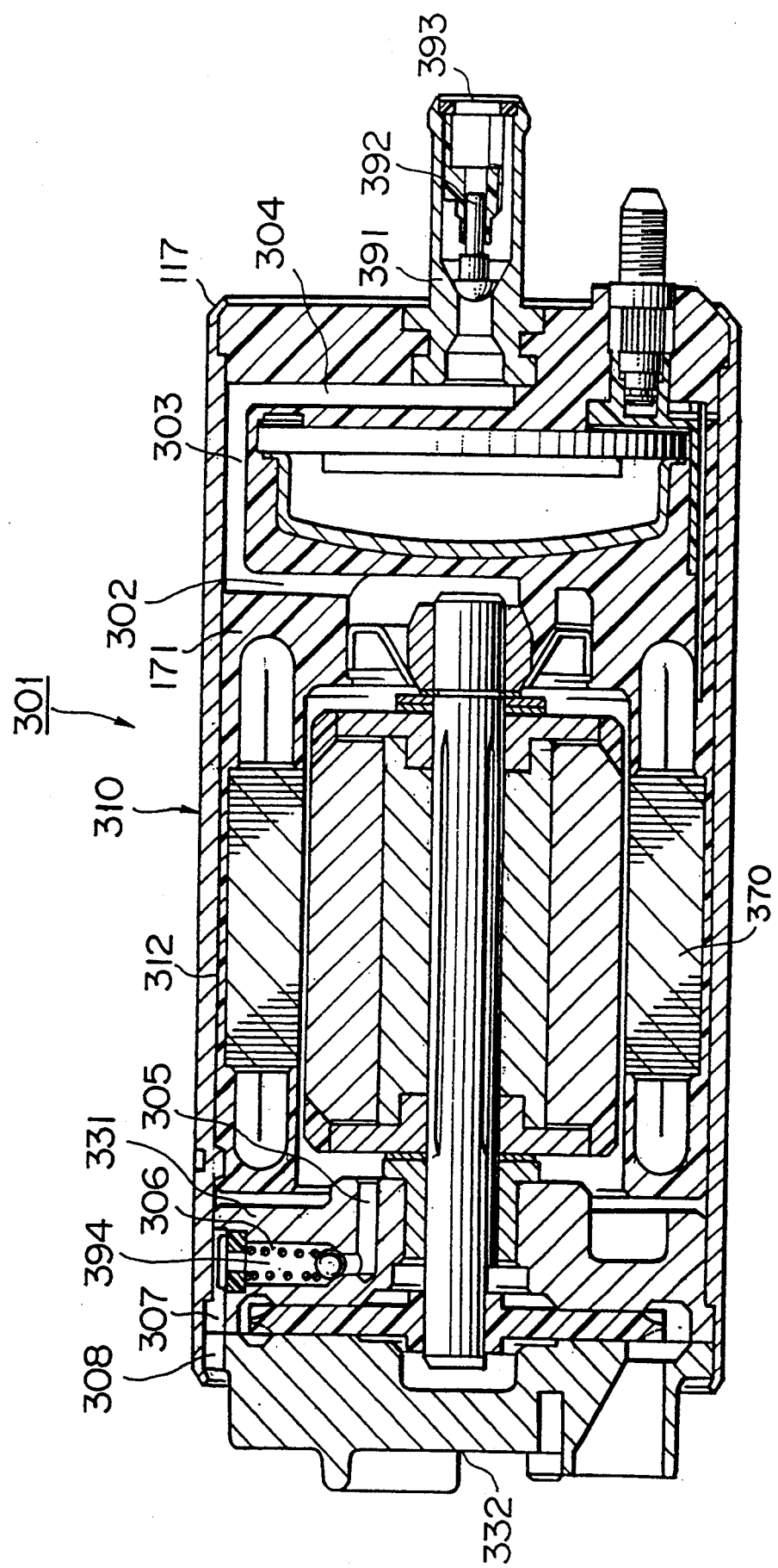
FIG. 9 is a vertical cross-sectional view of a fuel pump for a vehicle according to a fourth embodiment of the invention.

FIG. 9 is a cross-sectional view of a fuel pump 301 for a vehicle according to the fourth embodiment. Those parts of this embodiment, which correspond to those of the third embodiment and achieve generally similar functions, will not be explained here.

In this fourth embodiment, a stator portion 370 has a tubular member 391 of brass, and a pump casing 331 has a relief valve 394.

The tubular member 391 forms a discharge port 393, and a check valve 392 is provided therein. The tubular portion 391 is held by a mold when molding the stator portion 370, and a resin material 171 is molded integrally on the tubular member 391, so that the tubular member 391 constitutes part of the stator portion 370. The stator portion 370 has a fuel passageway 302 extending radially from the inner side of the stator portion 370, a groove 303 extending along a thickened portion 312 of a housing 310, and a fuel passageway 304 extending radially from the groove 303. The fuel in the stator portion flows to the discharge port 393 via the fuel passageway 302, the groove 303 and the fuel passageway 304. Like the end cover 191 of the second embodiment, the stator portion 370 is fixed by a press-deformed portion 117 of the housing 310.

The pump casing 331 has a hole 305 communicated with the interior of the housing 310, and a radially-extending hole 306. The relief valve 394 is received within the hole 306. The pump casing 331 also has a groove 307 extending from the hole 306 along the housing 310. A pump cover 332 has a groove 308 communicated directly with the groove 307. With this arrangement, the fuel discharged from the relief valve 394 is discharged to the exterior of the housing 310.

In this embodiment, the tubular portion 391 forming the discharge port 393 is formed integral with the stator portion 370. Therefore, in this embodiment, the number of the component parts can be reduced.

In this fourth embodiment, all the electrically-conductive portions are covered as in the second embodiment, and effects similar to those achieved with the second embodiment can be attained.

As described above, in the present invention, the stator coils, the control circuit, and the electrically-conductive portions connecting them together are covered with the resin material, and therefore these portions are not exposed to the fuel, and an electrolytic corrosion of these portions can be prevented, and difficulties such as a conduction failure and a short-circuiting can be prevented.

What is claimed is:

1. A fuel supply device for feeding fuel under pressure, comprising:
   a cylindrical housing;
   a preliminarily assembled cylindrical part having a closed bottom and fixed to said housing;
   a rotor having a permanent magnet fixedly mounted thereon, said rotor being rotatably received in a columnar-shaped space enclosed by a cylindrical-shaped wall portion of said preliminarily assembled part;
   a plurality of stator coils supported on said cylindrical-shaped wall portion of said preliminarily assembled part and mounted around said rotor;
   a control circuit supported on a bottom wall portion of said preliminarily assembled part and having two input terminals for power supply and a plurality of output terminals provided in accordance with said plurality of stator coils whereby said control circuit controls a supply of electricity to said stator coils by successively supplying electrical power from said input terminals to said plurality of output terminals;
   a pump portion fixed to said housing and driven by said rotor to feed fuel under pressure, using an interior portion of said housing as a fuel passageway;
   electrically-conductive members electrically connected between said output terminals of said control circuit and said stator coils; and
   an enclosure member enclosing said control circuit, said stator coils, and said electrically-conductive members;
   wherein said preliminarily assembled part has said output terminals extended outside said bottom wall portion; and
   wherein said preliminarily assembled part being fixed to said housing after said enclosure member has integrally supported said control circuit, said stator coils and said electrically-conductive members.

2. A fuel supply device according to claim 1, in which said enclosure member is made of a resin material.

3. A fuel supply device according to claim 1, in which said enclosure member has a resin portion of a resin material molded into a generally cylindrical shape having a closed bottom, said control circuit being provided at a bottom portion of said resin portion, said stator coils being provided at a peripheral wall portion of said resin portion, and said electrically-conductive members being embedded in said resin portion.

4. A fuel supply device according to claim 3, in which a communication hole for passing fuel therethrough is formed in said bottom portion of said resin portion.

5. A fuel supply device according to claim 1, in which said enclosure member is a container.

6. A fuel supply device according to claim 5, in which said container has an outer peripheral cylindrical portion and an inner peripheral cylindrical portion which are arranged in concentric relation to each other, one end of said outer peripheral cylindrical portion being closed at one end portion of said container, one end of said inner peripheral cylindrical portion opposite said one end of said outer peripheral cylindrical portion being closed, said opposite end of said outer peripheral cylindrical portion forming a cavity portion of predetermined size and shape, said stator coils being fixed within a space formed between said outer and inner peripheral cylindrical portions, and said control circuit being fixed within said cavity portion.

7. A fuel supply device according to claim 8, in which said container is accommodated within said housing forming a communication space therebetween for passing fuel therethrough.

8. A fuel supply device according to claim 1, in which said enclosure member includes a container having an internal space of a generally cylindrical shape with a closed bottom, said control circuit being provided in a bottom space of said container, said stator coils being provided in a peripheral wall space of said container, and said electrically-conductive members being provided in said internal space.

9. A fuel supply device according to claim 8, in which said container is accommodated within said housing forming a communication space therebetween for passing fuel therethrough.

10. A fuel supply device for feeding fuel under pressure, comprising:
    a cylindrical housing;

a preliminarily assembled cylindrical part having a closed bottom and fixed to said housing;

a rotor having permanent magnet fixedly mounted thereon, said rotor being rotatably received in a columnar-shaped space enclosed by a cylindrical-shaped wall portion of said preliminarily assembled part;

a plurality of stator coils supported on said cylindrical-shaped wall portion of said preliminarily assembled part arranged around said rotor;

a control circuit supported on a bottom wall portion of said preliminarily assembled part and having two input terminals for power supply and a plurality of output terminals provided in accordance with said plurality of stator coils whereby said control circuit controls a supply of electricity to said stator coils by successively supplying electrical power from said input terminals to said plurality of output terminals;

a container accommodating said control circuit and having said input terminals and said output terminals extended outside thereof;

a pump portion fixed to said housing and driven by said rotor to feed fuel under pressure, using an interior portion of said housing as a fuel passageway;

electrically-conductive members electrically connected between said output terminals of said control circuit and said stator coils; and a resin portion in said preliminarily assembled part embedding said output terminals, said stator coils, and said electrically-conductive members, said resin portion isolating said output terminals, said stator coils, and said electrically-conductive members from fuel, said resin portion fixed to said housing after integrally supporting said control circuit, said stator coils, and said electrically-conductive members wherein said preliminarily assembled part is formed to have a bottom cylindrical shape supporting said container, said stator coils and said electrically-conductive members, and has said input terminals extended outside said bottom wall portion.

11. A fuel supply device according to claim 10, wherein:

said preliminarily assembled part is fixed to said housing, said bottom wall portion of said cylindrical resin portion closing one end of said housing;

said pump portion is fixed to said housing closing an opposite end of said housing; and said rotor having a shaft supported between said bottom wall portion of said cylindrical resin portion and said pump portion.

12. A fuel supply device according to claim 11, in which a communication hole through which fuel fed under pressure from said pump portion is passed is formed in said bottom portion of said resin portion.

13. A fuel supply device according to claim 10, in which said container includes:

a flat plate member; and
a dome-shaped member.

14. A fuel supply device according to claim 10, in which said container includes:

a flat plate member on which said control circuit is fixed, and a dome-shaped member covering said control circuit.

15. A fuel supply device according to claim 10, further including a positioning member for positioning said container and said stator coils before said embedding resin portion is fixed to said container and said stator coils.

16. A fuel supply device according to claim 10, further including a positioning member extending over a region where said container and said stator coils are provided, said positioning member positioning said container and said stator coils before said embedding resin portion fixes said container and said stator coils, said positioning member supporting an input terminal for said control circuit.

17. A fuel supply device according to claim 10, wherein said input terminals and said output terminals of said control circuit are provided on a bottom wall portion of said container, said container, said bottom wall portion of said container facing an outside surface of said bottom wall portion of said preliminary assembled part.

18. A fuel supply device according to claim 10, wherein said stator coils are wound about stator cores, said stator cores exposed outside said resin material portion.

19. A fuel supply device for feeding fuel under pressure, comprising:

a cylindrical housing;

a preliminarily assembled cylindrical part having a closed bottom and fixed to said housing;

a rotor having a permanent magnet fixedly mounted thereon, said rotor being rotatably received in a columnar-shaped space enclosed by a cylindrical-shaped wall portion of said preliminarily assembled part;

a plurality of stator coils supported on said cylindrical-shaped wall portion of said preliminarily assembled part and arranged around said rotor;

a control circuit supported on a bottom wall portion of said preliminarily assembled part and having two input terminals for power supply and a plurality of output terminals provided in accordance with said plurality of stator coils whereby said control circuit controls a supply of electricity to said stator coils by successively supplying electrical power from said input terminals to said plurality of output terminals;

a pump portion fixed to said housing and driven by said rotor to feed fuel under pressure, using an interior portion of said housing as a fuel passageway; and electrically-conductive members electrically connected between said output terminals of said control circuit and said stator coils;

a container in said preliminarily assembled part receiving said electrically-conductive members and having said input terminals of said control circuit exposed from said bottom wall portion;

wherein said container is fixed to said housing after integrally supporting said control circuit, said stator coils, and said electrically-conductive members; and wherein said preliminarily assembled part has a cylindrical-shaped space provided within said cylindrical-shaped wall portion and has a columnar-shaped space provided on said bottom wall portion to support said control circuit and said stator coils, said control circuit being fixed in said columnar-shaped space on said bottom wall portion and said stator coils being fixed in said cylindrical-shaped space on said cylindrical-shaped wall portion.

20. A fuel supply device according to claim 19, wherein:

said preliminarily assembled part is fixed to said housing, said bottom wall portion of said cylindrical container closing one end of said housing, said pump portion fixed to said housing closes an opposite end of said housing, and said rotor having a shaft supported between said bottom wall portion of said cylindrical container and said pump portion.

21. A fuel supply device according to claim 20, in which a communication space through which fuel fed under pressure from said pump portion is passed is formed between said housing and said container.

22. A method of assembling a fuel supply device including a cylindrical housing, said housing containing therein a rotor having a permanent magnet fixedly mounted thereon, a plurality of stator coils arranged around said rotor, a control circuit for controlling an energization of said stator coils, electrically-conductive members electrically connecting said stator coils to said control circuit, and a pump portion driven by said rotor; an interior of said housing being a fuel passageway; said method comprising the steps of:

forming a cylindrical assembly by integrally fixing said stator coils and said control circuit by a fixing member of a generally cylindrical shape with a closed bottom thereby providing said control circuit at a bottom portion of said fixing member and thereby providing said stator coils at a peripheral wall portion of said fixing member, said stator coils, said control circuit and said electrically-conductive members being isolated from fuel by said fixing member;

subsequently inserting said cylindrical assembly into said housing from one open end of said housing; and fixing said cylindrical assembly to said housing.

23. A method of assembling a fuel supply device including a cylindrical housing, said housing containing therein a rotor having a permanent magnet fixedly mounted thereon, a plurality of stator coils arranged around said rotor, a control circuit for controlling an energization of said stator coils, electrically-conductive members electrically connecting said stator coils to said control circuit, and a pump portion driven by said rotor; an interior of said housing being a fuel passageway; said method comprising the steps of:

forming a resin portion of a resin material having a generally cylindrical shape with a closed bottom, said resin portion integrally fixing said stator coils and said control circuit with said control circuit being provided at a bottom portion of said resin portion, said stator coils being provided at a peripheral wall portion of said resin portion, and said electrically-conductive members being embedded in said resin portion, whereby said resin portion cooperates with said stator coils, said control circuit and said electrically-conductive members to provide a cylindrical assembly;

subsequently inserting said cylindrical assembly into said housing from one open end of said housing; and fixing said cylindrical assembly to said housing.

24. A method of assembling a fuel supply device including a cylindrical housing, said housing containing therein a rotor having a permanent magnet fixedly mounted thereon, a plurality of stator coils arranged around said rotor, a control circuit for controlling an energization of said stator coils, electrically-conductive members electrically connecting said stator coils to said control circuit, and a pump portion driven by said rotor; an interior of said housing being a fuel passageway; said method comprising the steps of:

providing a container having an internal space of a generally cylindrical shape with a closed bottom;

providing said control circuit in a bottom space of said container;

providing said stator coils in a peripheral wall space of said container;

providing said electrically-conductive members in said internal space and connecting said electrically-conductive members to said control circuit;

subsequently inserting said container being provided with a closed bottom, said control circuit, said stator coils, and said electrically-conductive members into said housing from one open end of said housing; and fixing said container to said housing.

* * * * *